(12) United States Patent
Brune et al.

(10) Patent No.: US 10,051,058 B2
(45) Date of Patent: Aug. 14, 2018

(54) METHOD FOR CLASSIFYING A DATA SEGMENT WITH RESPECT TO ITS FURTHER PROCESSING

(71) Applicant: Robert Bosch GmbH, Stuttgart (DE)

(72) Inventors: Andreas Brune, Backnang (DE); Herbert Leuwer, Backnang (DE); Stefan Fuhrmann, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 241 days.

(21) Appl. No.: 14/689,523

(22) Filed: Apr. 17, 2015

(65) Prior Publication Data

US 2015/0312150 A1    Oct. 29, 2015

(30) Foreign Application Priority Data

Apr. 17, 2014  (DE) .................. 10 2014 207 479

(51) Int. Cl.
*H04L 29/08*  (2006.01)
*H04L 29/06*  (2006.01)

(52) U.S. Cl.
CPC .............. *H04L 67/12* (2013.01); *H04L 69/12* (2013.01); *H04L 69/22* (2013.01)

(58) Field of Classification Search
CPC .......... H04L 67/12; H04L 69/12; H04L 69/22
See application file for complete search history.

(56) References Cited

U.S. PATENT DOCUMENTS

| | | | |
|---|---|---|---|
| 5,748,905 A * | 5/1998 | Hauser | H04L 29/06 709/249 |
| 6,128,627 A | 10/2000 | Mattis et al. | |
| 8,504,718 B2 | 8/2013 | Wang et al. | |
| 8,681,795 B1 * | 3/2014 | Verwillow | H04L 69/22 370/392 |
| 8,923,301 B1 * | 12/2014 | Verwillow | H04L 69/22 370/392 |
| 2004/0181303 A1 * | 9/2004 | Walmsley | B41J 2/04505 700/115 |

* cited by examiner

*Primary Examiner* — Sulaiman Nooristany
(74) *Attorney, Agent, or Firm* — Norton Rose Fulbright US LLP; Gerard Messina (57) ABSTRACT

A method is provided for classifying a data segment with respect to its further processing in a data transporting unit, in particular in a network processor. The data segment is provided by an input interface. A first key for a lookup table is ascertained as a function of an identifier (chid) established in advance and as a function of an identifier (devid) of the input interface from which the data segment stems. A second key for the lookup table is ascertained.

15 Claims, 6 Drawing Sheets

METHOD FOR CLASSIFYING A DATA SEGMENT WITH RESPECT TO ITS FURTHER PROCESSING

FIELD OF THE INVENTION

The present invention relates to a method for classifying a data segment with respect to its further processing.

BACKGROUND INFORMATION

It is known that communication controllers for networks such as CAN (controller area network) or FlexRay may have filter functions for particular data packets to filter out and monitor only a section of the network traffic.

For gateways, data packet filters may be implemented with high complexity regarding the data memory due to the large communication matrices. In particular, the increased number of network types and the increased number of networks in the automotive field make the design of a flexible gateway unit between different networks difficult.

SUMMARY

An object underlying the present invention is achieved by a method. Important features for the present invention may also be found in the following description and in the drawings. The features are important for the present invention either alone or also in combination, without making reference thereto again.

A flexible address space is spanned by ascertaining a first key for a lookup table and a second key for the look-up table. The first and second keys advantageously point to an address space which is reserved in particular for an identifier of the input data unit and for the identifier established in advance.

In one advantageous specific embodiment, parameters for further processing a data segment are ascertained from the lookup table as a function of the first and the second key, whereby a leaky filter is created, which determines the further processing of the data segment according to a white list in the form of present parameters.

In one advantageous specific embodiment, the second key is ascertained as a function of the identifier established in advance, whereby a simple ascertainment of the second key is created.

In one advantageous specific embodiment, the second key is ascertained as a function of a piece of header information of a data packet of an encapsulated network protocol, whereby the classification of the data segment is carried out with a consideration of the encapsulated network protocol.

In one advantageous specific embodiment, a third key is ascertained for the lookup table as a function of a first section of the header information, and a fourth key is ascertained for the lookup table as a function of a second section of the header information. The third or the fourth key is then selected as the second key. Advantageously, it is not necessary for all permutations of possible pieces of header information, in particular of the address information contained in the header information, to be mapped in an accordingly large hash table. In this way, both the complexity with respect to the data which are kept available is reduced, and a terminating process may be created. The method may thus advantageously be carried out in hardware, the data complexity being reduced at the same time.

In one advantageous embodiment of the method, rule keys are ascertained, and one of the rule keys is selected. The second key is determined as a function of the selected rule key. A collision resolution with respect to the introduced method is provided by the additional rules, which determine the second key via a selected rule key. In this way, it is advantageously avoided that re-hashing is required, whereby a terminating behavior of the method is achieved.

In one advantageous specific embodiment, data segments are discarded when it is not possible to ascertain parameters for further processing the data segments from the lookup table based on the first key and/or based on the second key. In this way, advantageously a leaky filter is created, which with the aid of a white list in the form of the lookup table specifies that data segments, for example having a certain combination of the identifier established in advance and of the identifier of the input data unit, are further processed. Data segments for which no entry is present in the lookup table are discarded.

All features of the method are designed in such a way that the method may be carried out in a terminating manner, whereby a hardware implementation as an integrated circuit becomes possible.

Additional features, application options and advantages of the present invention are derived from the following description of exemplary embodiments of the present invention, which are shown in the figures of the drawings. All described or illustrated features, either alone or in any arbitrary combination, form the subject matter of the present invention, regardless of the summary thereof in the patent claims or their back reference, and regardless of the wording or representation thereof in the description or in the drawings. Functionally equivalent variables and features in all figures are denoted by identical reference symbols, even in different specific embodiments.

DETAILED DESCRIPTION

Figure 1:
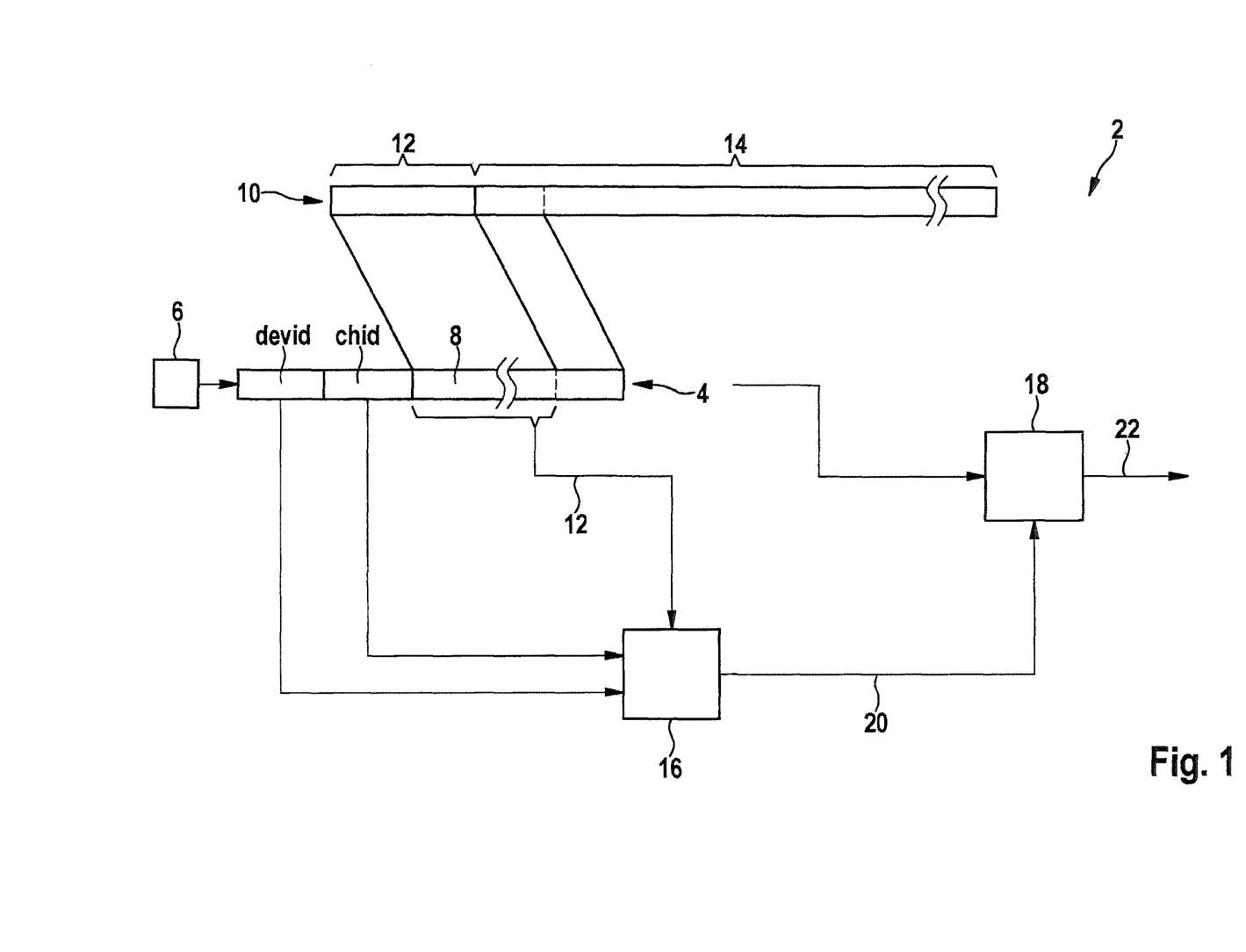
FIGS. 1 through 3 in each case show a schematic block diagram.

FIG. 1 shows a schematic block diagram 2. A data segment 4 is provided by an input interface 6. Data segment 4 includes an identifier chid established in advance, which is also referred to as channel identifier. Data segment 4 furthermore includes an identifier devid of input interface 6. Data segment 4 furthermore includes a data area 8, which is also referred to as payload of data segment 4. Data segment 4 may furthermore include additional pieces of information, for example the position of data segment 4 as part of a data block including multiple data segments 4.

A data packet 10 of an encapsulated network protocol includes a piece of header information 12 and a data area 14. As shown in FIG. 1, data area 8 of data segment 4 includes only a portion of data packet 10. By way of example, data segment 4 in FIG. 1 is a first of multiple data segments 4 for transmitting data packet 10.

Identifier chid agreed-upon in advance, identifier devid of input interface 6 and, in the case of a first data segment 4, header information 12 of data packet 10 are supplied to a block 16. Block 16 ascertains parameters 20 for further processing data segment 4 from a lookup table described hereafter as a function of the supplied variables. Block 16 thus classifies a data segment 4 with respect to its further processing in a data transporting unit, in particular in a network processor, the data transporting unit including at least block 16 and a block 18, parameters 20 and corresponding data segment 4 being supplied to block 18. According to an arrow 22, block 18 forwards data segments 4 for which parameters 20 were able to be ascertained to one or multiple output interfaces, which are not shown.

Data packet 10 may be a CAN data packet, a FlexRay data packet, a universal measurement calibration protocol (XCP) data packet, a CAN calibration protocol (CCP) data packet or an Ethernet data packet, for example. Of course further network protocols not mentioned here are conceivable in this context.

One of parameters 20 identifies a queue, for example, within block 18 for further processing data segment 4. One of parameters 20 identifies a processing unit within block 18, to which data segment 4 is supplied, for example for further processing the data segment.

Advantageously, all methods described here are designed in such a way that block 16 generates an output in the form of parameters 20 in a terminating manner, i.e., in a finite number of processing steps, in response to an input in the form of a data segment 4. Block 16 may therefore advantageously be designed as an integrated circuit. An integrated circuit includes an application specific integrated circuit (ASIC) or a field programmable gate array (FPGA), for example.

Figure 2:
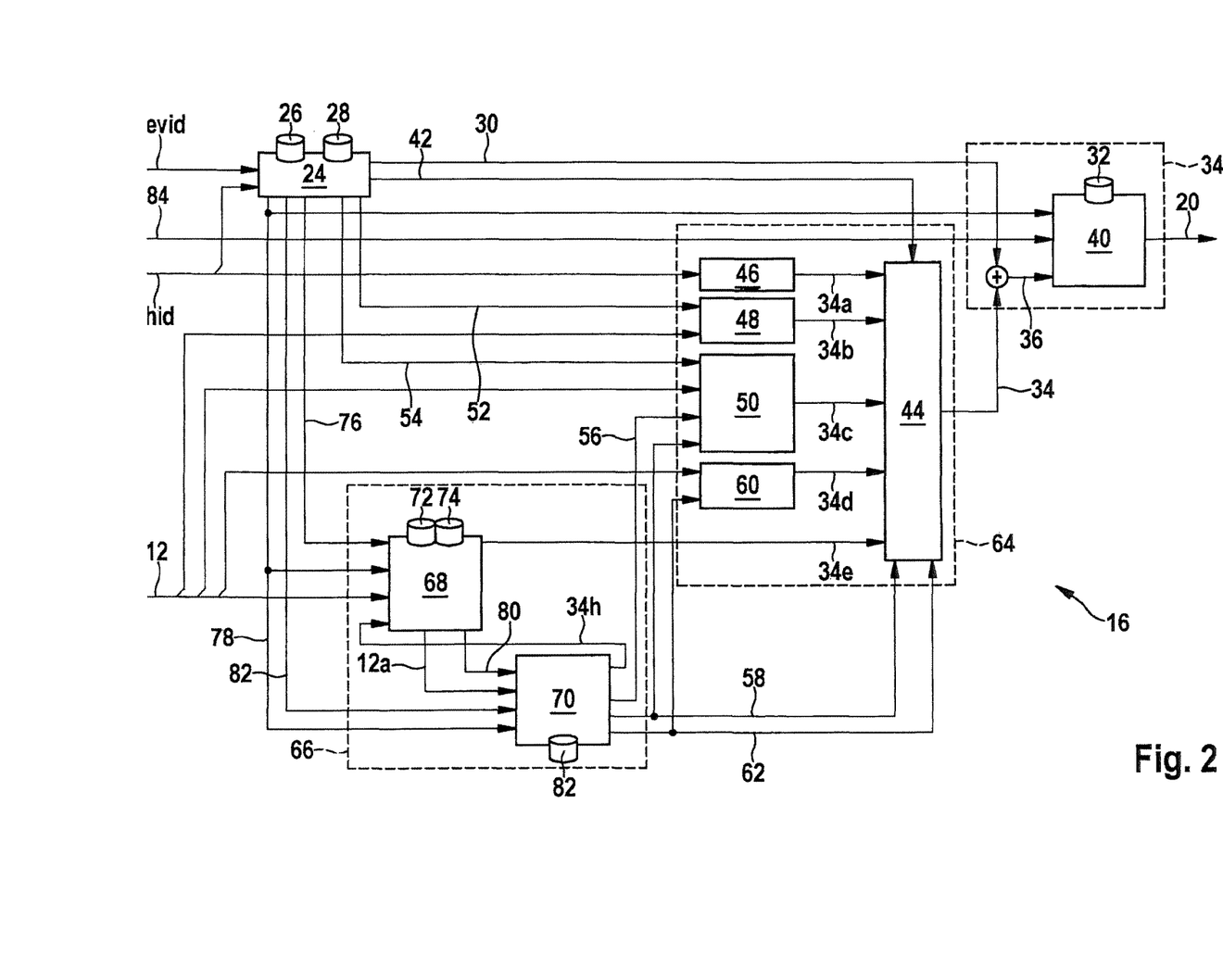

FIG. 2 shows a schematic block diagram of a section of block 16, which classifies a data segment with respect to its further processing by ascertaining parameters for further processing the data segment. Of course the classification of a single data segment also includes the classification of a data block which has multiple data segments. For example, as is described hereafter, a piece of header information in a first data segment of a data block may advantageously be used to ascertain corresponding parameters which are also used for the data segments of the data block following the first data segment for processing the same.

Identifier chid established in advance and identifier devid of input interface 6 are supplied to a block 24. Output variables of block 24 are formed as a function of identifier chid established in advance and of identifier devid of input interface 6. Block 24 accesses a first preconfigurable table 26 and a second preconfigurable table 28. In a first case, a first key 30 may be ascertained with the aid of table 26 based on identifier devid of input interface 6. In another case, first key 30 may be ascertained as a function of identifier devid of input interface 6 and identifier chid agreed-upon in advance, with the aid of identifier chid agreed-upon in advance, in addition to identifier devid, via table 28. Via first key 30, memory areas in lookup table 32 may be addressed, for example, which are assigned to one of input interfaces 6, or which are assigned to one of input interfaces 6 and identifier chid agreed-upon in advance.

First key 30 and a second key 34 are supplied to an area 34. A lookup key 36 is formed from first key 30 and second key 34, for example by adding first key 30 and second key 34. In the addition, second key 34 represents an offset from first key 30, for example. Of course other combinations of first key 30 and second key 34 are also conceivable to ascertain lookup key 36.

A block 40 accesses preconfigurable lookup table 32 as a function of lookup key 36 and thus ascertains, from lookup table 32, parameters 20 for further processing data segment 4 undergoing processing. Via a piece of information 84, it is communicated to block 40 whether analyzed data segment 4 is a last, a first, or a middle data segment 4 of a data block or a data packet 10. If block 40 is not able to ascertain a parameter or parameters 20 for further processing data segment 4 for supplied lookup key 36 in lookup table 32, data segment 4 is not further processed and discarded. As a result of discarding a data segment 4 which is not detected from a preconfiguration in lookup table 32, advantageously no filter elements must be provided upstream of input interface 6 in the area of the particular network, and the filtering of the data currents of different sub-networks or network types may advantageously be carried out in a centralized manner by block 16. Moreover, a hardware implementation of block 16 represents a further improvement.

According to signal 42, it is signaled to a block 44 which of the input signals of block 44 is forwarded as second key 34.

Block 46 ascertains a second key 34a as a function of identifier chid established in advance.

Block 48 generates a second key 34b as a function of pieces of header information 12 of a data packet 10 and as a function of a signal 52, signal 52 being generated by block 24 and communicating to block 48 which protocol and which area of header information 12 are to be evaluated.

A block 50 is an XCP classifier for the universal measurement calibration protocol (XCP). Via signal 54, block 24 communicates to block 50 at which location the XCP header is present in the data since XCP is transmitted via Ethernet, CAN or FlexRay, for example, and thus pieces of header information 12 of the network types differ, and consequently also the position of the XCP header is present in another or different position. Via a signal 56, pieces of information regarding the starting position of the XCP header in header 12 and pieces of information regarding the coding of the XCP header are transmitted to block 50. According to a signal 58, block 50 for generating a second key 34c is selected.

A block 60 generates a second key 34d as a function of header 12 and a signal 62, which selects block 60 for generating second key 34d. Block 60 generates second key 34d from pieces of header information 12 for the CAN calibration protocol (CCP).

A block 64 is thus used to generate and select second key 34. Second key 34 is formed in particular by the evaluation of header information 12. A data frame identification (FRAME ID) from header information 12, and in particular a source address and/or a destination address in header information 12, may advantageously be evaluated in such a way that a biunique connection may be established between devid, chid, header information 12 and parameters 20, i.e., an entry in lookup table 32.

A block 68 and a block 70 are contained in a block 66. Block 68 accesses a third table 72 and a fourth table 74. Block 68 generates a second key 34e. Via a signal 76, block 24 supplies to block 68 the information on the mode in which block 68 is to generate second key 34e.

With the aid of table 28, block 24 generates a signal 78 which identifies one of multiple virtual input interfaces. According to a signal 82, it is communicated to block 70 that the virtual input interface is to be used.

Block 68 generates a further piece of header information 12a, which represents the header information of the analyzed protocol. Block 68 furthermore generates a rule key 80 for block 70. Block 70 accesses a rule table 82.

Figure 3:
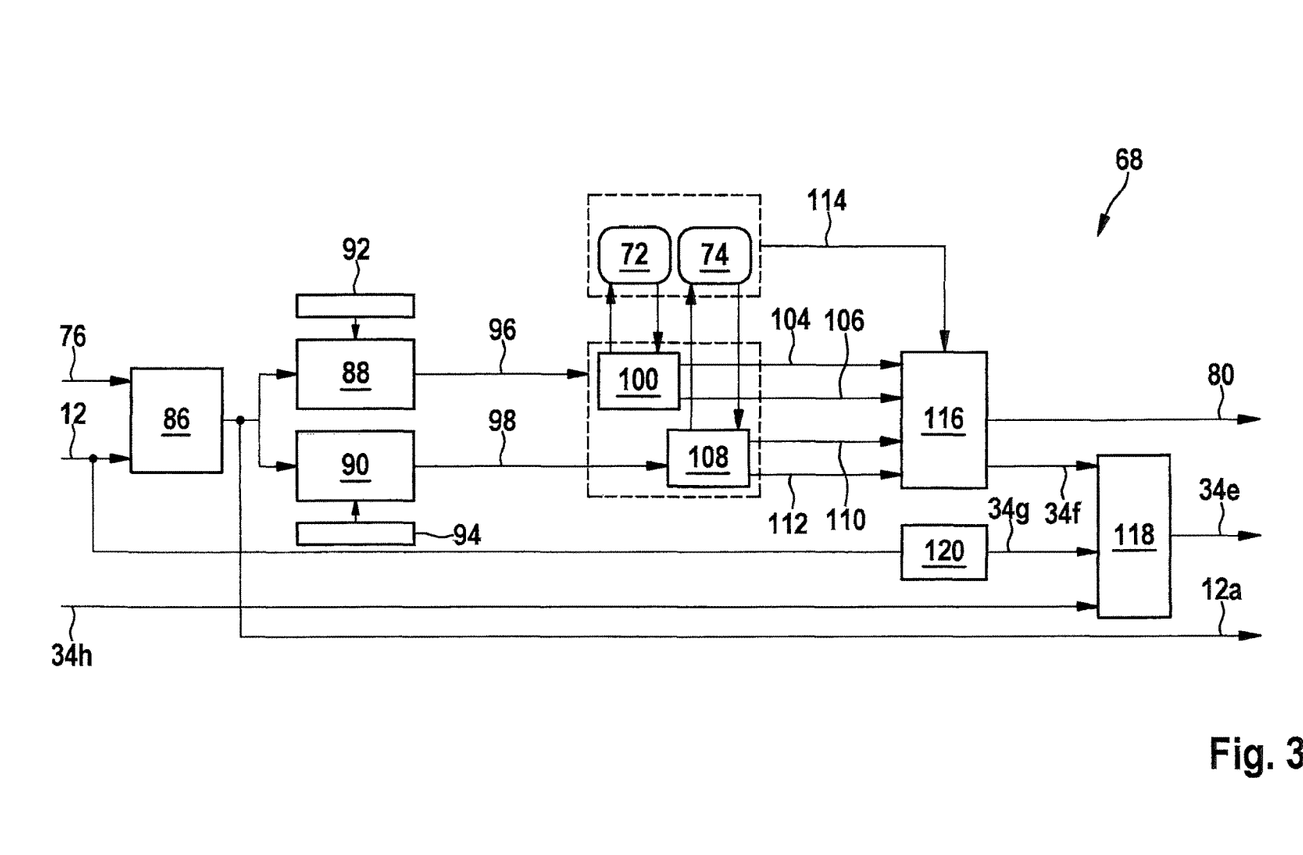

FIG. 3 shows a schematic block diagram of a section from which block 68 generates header information 12a as a function of header information 12 and signal 76. Header information 12a is supplied to blocks 88 and 90, blocks 88 and 90 in each case generating a first section 96 and a second section 98 in each case with the aid of preconfigurable masks 92 and 94. First section 96 corresponds to a top area from header 12a, for example, and second section 98 corresponds to a bottom area from header 12a. A block 100 ascertains a third key 104 and a first rule key 106 from preconfigured table 72 as a function of first section 96. A block 108 ascertains a fourth key 110 and a second rule key 112 from preconfigured table 74 as a function of second section 98.

According to a signal 114, weightings are read out from tables 72 and 74, which represent a weighting between blocks 100 and 108 for monitored data segment 4. Based on the weightings according to signal 114, a block 116 decides which one of keys 104 and 110 is forwarded as second key 34f to a block 118. Based on the weightings according to signal 114, block 116 furthermore decides which one of rule keys 106 and 112 is forwarded as selected rule key 80. A preconfigurable block 120 generates a second key 34g based on header information 12, for example based on a type information of data packet 10. Block 118 is furthermore supplied a second key 34h, which is generated by block 70. Block 118 selects a second key 34e for forwarding among second keys 34f, 34g and 34h.

Figure 4:
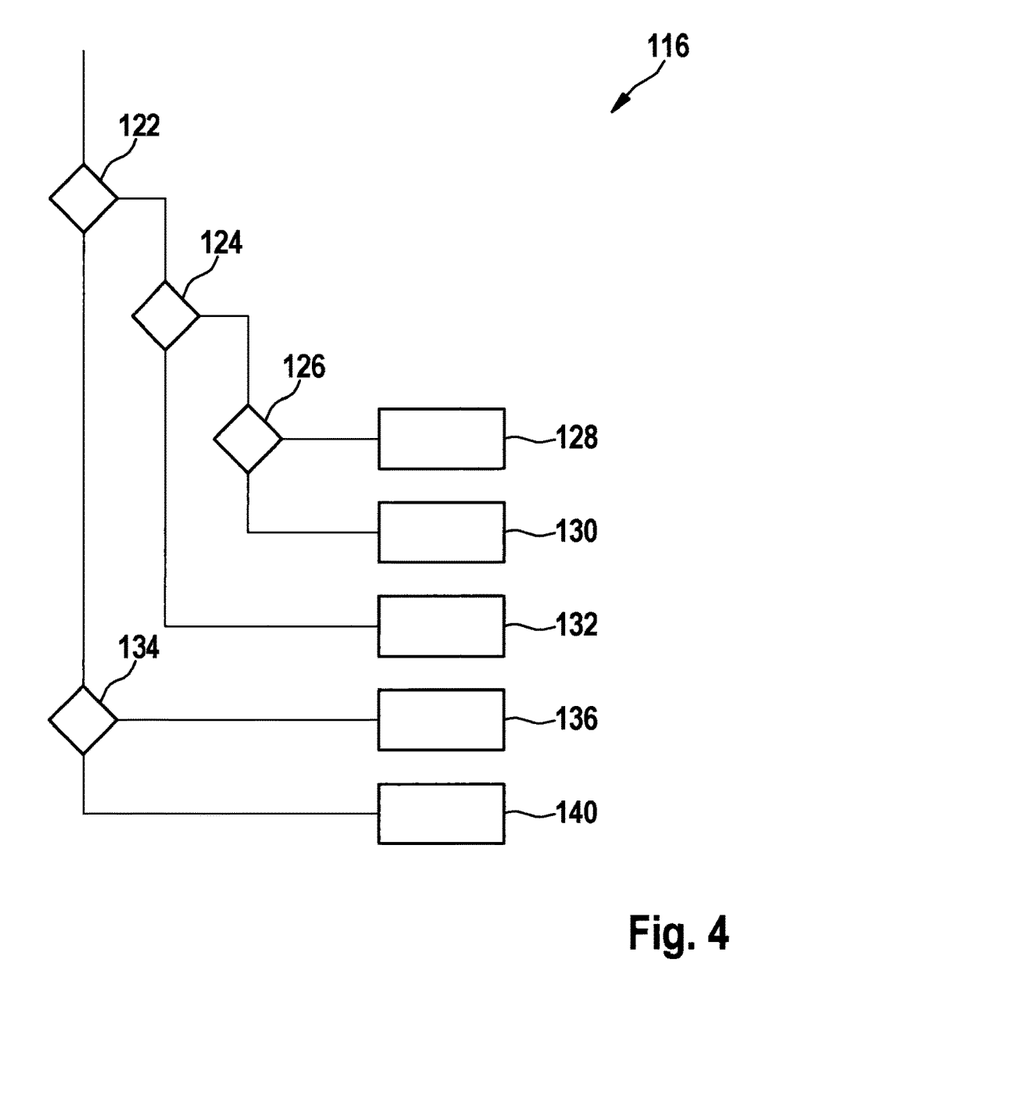
FIGS. 4 and 5 in each case show a schematic flow chart.

FIG. 4 shows a schematic flow chart as part of block 116 for generating second key 34f. If a valid third key 104 is ascertained from table 72, a switch is made from location 112 to location 124. At location 124, it is checked whether fourth key 110 from table 74 was validly generated. If fourth key 110 was validly generated, a switch is made from location 124 to location 126. At location 126, the weightings from tables 72 and 74 with respect to blocks 100 and 108 are compared to each other. If the weighting with respect to block 100 is greater than that of block 108, according to block 128 third key 104 is forwarded to block 118 as second key 34f. If the weighting in comparison 126 was in favor of block 108, according to block 130 fourth key 110 is forwarded as second key 34f. If no valid fourth key 110 was ascertained from table 74 at location 124, third key 104 is forwarded as second key 34f according to a block 132. If no valid third key 104 was ascertained from table 72 at location 122, a switch is made to location 134. At location 134, it is checked whether a valid key 110 was ascertained from table 74. If a valid fourth key 110 was ascertained from table 74, according to a block 136 fourth key 110 is forwarded as second key 34f. If no valid key 110 was ascertained from table 74 at location 134, segment 4 is discarded according to a block 140.

The same principle as in FIG. 4 is applied to ascertain rule key 80. According to block 128 and block 132, first rule key 106 is forwarded as selected rule key 80. According to blocks 130 and 136, second rule key 112 is forwarded as selected rule key 80. According to block 140, no rule key 80 is selected, and corresponding data segment 4 is discarded.

Figure 5:
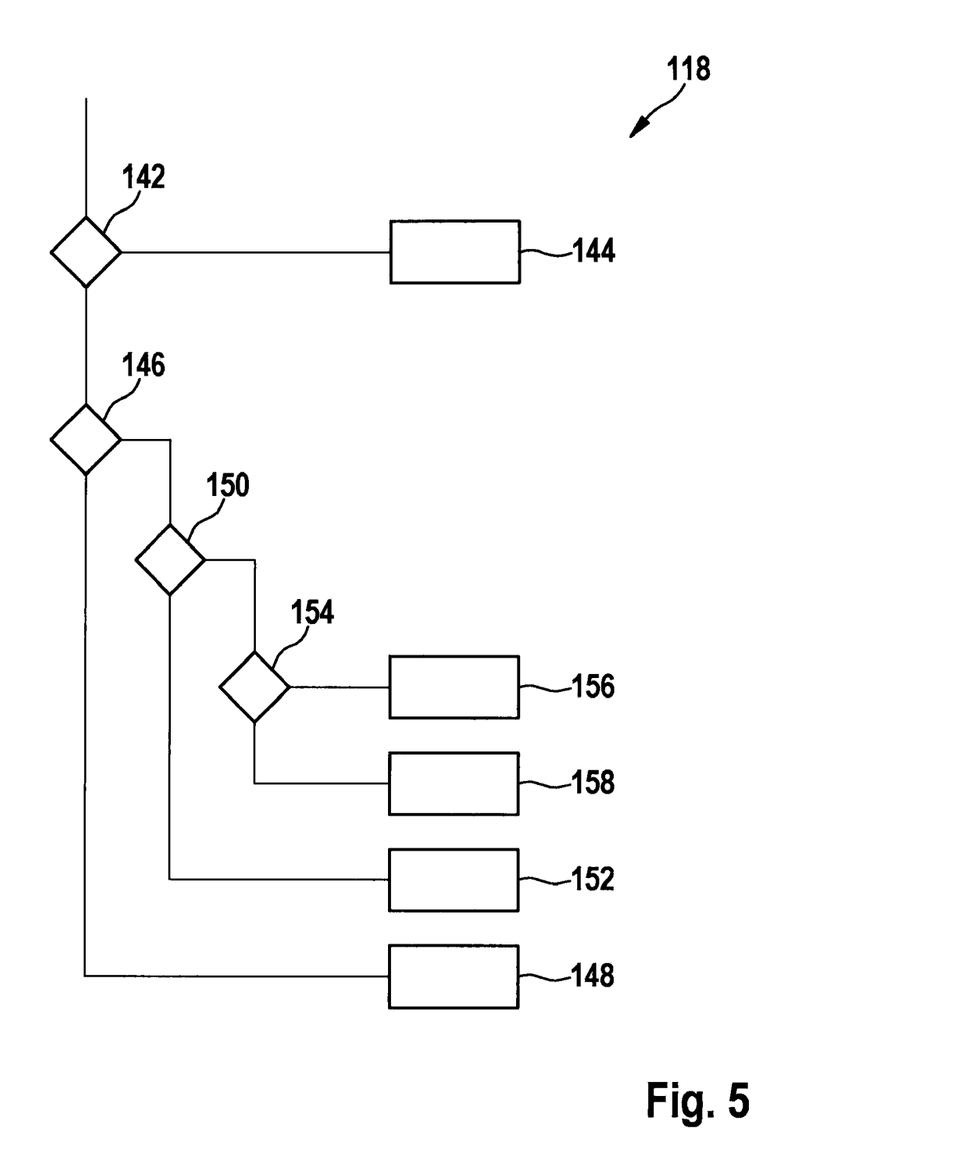

FIG. 5 shows a schematic flow chart as part of block 118 from FIG. 3. At a location 142, it is checked whether preconfigurable block 120 has validly generated a second key 34g. If second key 34g was validly generated, according to a block 144 second key 34g is forwarded as second key 34e. If it is established at location 142 that no valid second key 34g is present, a switch is made to location 146. At location 146, it is checked whether a valid second key 34f is present. If no valid second key 34f is present, data segment 4 is discarded according to a block 148. If a valid second key 34f is present, a switch is made to location 150. At location 150, it is checked whether a valid rule key 80 was generated. If no valid rule key 80 was generated, according to a block 152 second key 34f is selected as second key 34e and forwarded. If a valid rule key 80 was generated, a switch is made to location 154. If it is established at location 154 that a valid second key 34h was generated, the same is forwarded as second key 34e according to block 156. If it is established at location 154 that no valid second key 34h was generated, second key 34f is forwarded as second key 34e according to a block 158.

When reference is made above to a valid value, the wording "valid" shall be understood to mean that a corresponding entry was found in the particular preconfigured table.

Figure 6:
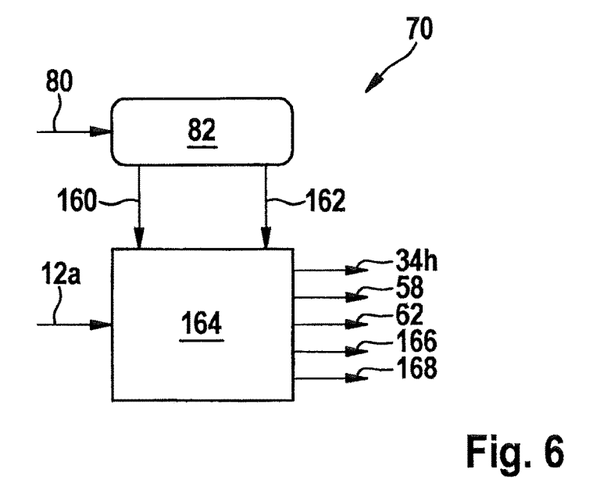
FIGS. 6 and 7 in each case show a schematic block diagram.

FIG. 6 shows a schematic block diagram as part of block 70 from FIG. 2. Block 70 ascertains entries 160 and 162 fitting rule key 80 from table 82 as a function of a supplied rule key 80. A block 164 carries out a method for ascertaining output variables 34h, 58, 62 and further variables 166 and 168 as a function of entries 160 and 162 and supplied header information 12a. For example, entry 160 may include a bit mask, which is linked to pieces of header information 12a with the aid of a logical AND operation. If this operation agrees with a value transmitted according to entry 160, it is possible to transmit second key 34h, for example, from associated entry 162 to bock 68. Moreover, entry 162 may include the corresponding values for outputs 58 and 62.

In contrast, if there is no equivalent in table 82 for the AND operation of header information 12a with the corresponding mask from entry 160, block 164 does not generate any valid outputs. The block diagram of block 70 may advantageously be used to resolve the cases in which conflicts still exist from header information 12a with respect to a hashing process, despite tables 72 and 74 being provided, and to ascertain a second key 34h. In this way, re-hashing is circumvented, and a hardware-based approach becomes possible with block 70.

Table 82 must be appropriately preconfigured; however, this reduces the scope of tables 72 and 74.

Figure 7:
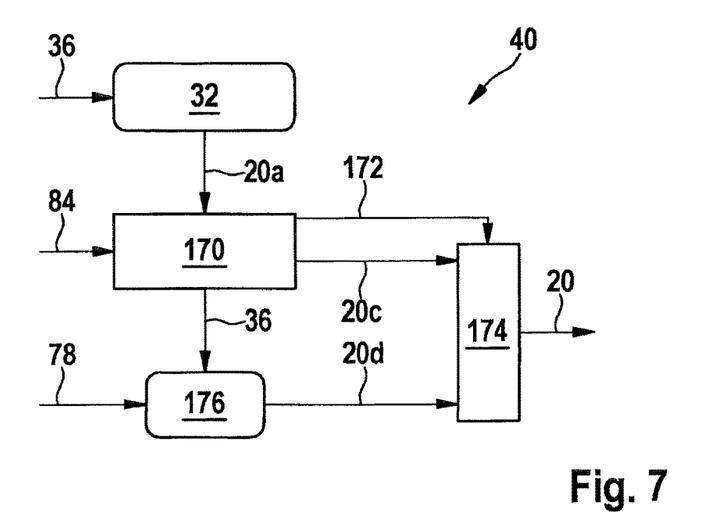

FIG. 7 shows a schematic block diagram of a section from block 40. Parameters 20a fitting lookup key 36 are transmitted from lookup table 32 to a block 170. With the aid of a signal 172, block 170 transmits to a block 174 which of parameters 20c and 20d are forwarded as parameter 20. If data segment 4 is a single, i.e., a first and a last data segment 4, parameters 20a are forwarded as parameters 20c from block 170 to block 174 and are forwarded by block 174 as parameters 20.

If, in contrast, according to signal 84 a data segment 4 is a first of multiple data segments 4 assigned to a data block and/or a data packet 10, lookup key 36 generated via blocks 24, 66 and 64 is stored in a buffer 176. For data segments 4 following first data segment 4, it is thus possible to reuse the result of blocks 34, 66 and 64 in the form of lookup key 36. As an alternative, parameters 20a are stored on an intermediate basis in buffer 176 and reused for middle and last data segments 4. According to a virtual input interface, signal 78 points to the corresponding entry in buffer 176, whereby block 170, according to parameters 20d, is able to retrieve these from lookup table 32 and forward as parameters 20.

What is claimed is:
1. A method for classifying a data segment with respect to a further processing of the data segment in a data transporting unit, comprising:
  providing the data segment by an input interface;
  ascertaining a first key for a lookup table as a function of
    an identifier established in advance and as a function of
    an identifier of the input interface from which the data
    segment stems;
  ascertaining a second key for the lookup table;

ascertaining parameters for further processing the data segment, the parameters being ascertained from the lookup table as a function of the first and the second keys; and discarding the data segment when at least one of the following is true:
  based on at least one of the first key and the second key, no parameters for further processing the data segment are ascertained from the lookup table, and
  based on at least one of the first section and the second section, no third key and no fourth key is ascertained, wherein the discarding is performed downstream of the input interface.

2. The method as recited in claim 1, wherein the second key is ascertained as a function of the identifier established in advance.

3. The method as recited in claim 1, wherein:
a first data segment of a data block having multiple data segments includes header information of a data packet of an encapsulated network protocol, and
the second key is ascertained as a function of the header information.

4. The method as recited in claim 3, further comprising:
storing the first and second keys for the first data segment of the data block;
ascertaining the parameters for further processing the multiple data segments from the lookup table as a function of the stored first and second keys.

5. The method as recited in claim 3, wherein the network protocol is one of CAN, FlexRay, XCP, CCP, and Ethernet.

6. The method as recited in claim 3, further comprising:
ascertaining a third key as a function of a first section of the header information;
ascertaining a fourth key as a function of a second section of the header information; and
selecting one of the third key and the fourth key as the second key.

7. The method as recited in claim 6, further comprising:
ascertaining a first weighting for the third key;
ascertaining a second weighting for the fourth key; and
selecting one of the third key and the fourth key as the second key as a function of a comparison of the first and the second weightings.

8. The method as recited in claim 7, further comprising:
ascertaining a first rule key as a function of the first section of the header information;
ascertaining a second rule key as a function of the second section of the header information; and
selecting one of the first rule key and the second rule key.

9. The method as recited in claim 8, wherein the one of the first rule key and the second rule key as a function of a comparison of the first and the second weightings.

10. The method as recited in claim 9, further comprising selecting a key stored in a rule table as the second key as a function of the selected rule key.

11. The method as recited in claim 1, wherein one of the parameters for further processing the data segment identifies a queue into which the data segment is written.

12. The method as recited in claim 1, wherein one of the parameters for further processing the data segment identifies a processing unit to which the data segment is supplied.

13. An integrated circuit for carrying out a method for classifying a data segment with respect to a further processing of the data segment in a data transporting unit, the integrated circuit comprising:
an arrangement for providing the data segment by an input interface,
an arrangement for ascertaining a first key for a lookup table as a function of an identifier established in advance and as a function of an identifier of the input interface from which the data segment stems,
an arrangement for ascertaining a second key for the lookup table
an arrangement for ascertaining parameters for further processing the data segment, the parameters being ascertained from the lookup table as a function of the first and the second keys, and
an arrangement for discarding the data segment when at least one of the following is true:
  based on at least one of the first key and the second key, no parameters for further processing the data segment are ascertained from the lookup table, and
  based on at least one of the first section and the second section, no third key and no fourth key is ascertained, wherein the discarding is performed downstream of the input interface.

14. The method as recited in claim 1, wherein the data transporting unit includes a network processor.

15. The method as recited in claim 3, wherein the header information includes a frame identification (frame ID).

* * * * *